(12) United States Patent
Avitan et al.

(10) Patent No.: US 12,056,978 B2
(45) Date of Patent: Aug. 6, 2024

(54) SYSTEM, METHOD AND COMPUTER PROGRAM PRODUCT FOR ASCERTAINING DOCUMENT LIVENESS

(71) Applicant: AU10TIX LTD., Hod Hasharon (IL)

(72) Inventors: Jakob Avitan, Moshav Tkuma (IL); Ofer Friedman, Givataim (IL)

(73) Assignee: AU10TIX LTD., Hod Hasharon (IL)

( * ) Notice: Subject to any disclaimer, the term of this patent is extended or adjusted under 35 U.S.C. 154(b) by 775 days.

(21) Appl. No.: 17/087,877

(22) Filed: Nov. 3, 2020

(65) Prior Publication Data
US 2022/0139143 A1 May 5, 2022

(51) Int. Cl.
| | | |
|---|---|---|
| *G07D 7/00* | (2016.01) | |
| *G06N 3/04* | (2023.01) | |
| *G07D 7/121* | (2016.01) | |
| *G07D 7/17* | (2016.01) | |
| *G07D 7/20* | (2016.01) | |

(52) U.S. Cl.
CPC ............ *G07D 7/17* (2017.05); *G06N 3/04* (2013.01); *G07D 7/0032* (2017.05); *G07D 7/121* (2013.01); *G07D 7/2083* (2013.01)

(58) Field of Classification Search
CPC ........ G07D 7/17; G07D 7/0032; G07D 7/121; G07D 7/2083; G07D 7/164; G06N 3/04; G06V 20/80; G06V 20/95; G06V 30/413; G06V 40/40; B42D 25/328
See application file for complete search history.

(56) References Cited

U.S. PATENT DOCUMENTS

| | | |
|---|---|---|
| 9,406,030 B2 | 8/2016 | Dolev et al. |
| 9,628,661 B2 | 4/2017 | Dolev |
| 10,440,219 B2 | 10/2019 | Dolev |
| 10,467,491 B2 | 11/2019 | Markin et al. |
| 10,607,072 B2 | 3/2020 | Atzmon et al. |
| 2001/0022848 A1* | 9/2001 | Rhoads .............. H04N 1/32144 704/E19.009 |
| 2008/0112596 A1 | 5/2008 | Rhoads et al. |

(Continued)

FOREIGN PATENT DOCUMENTS

| | | | |
|---|---|---|---|
| CH | 716082 A1 | 10/2020 | |
| CN | 105096443 A * | 11/2015 | ............... G01B 7/06 |

(Continued)

OTHER PUBLICATIONS

Lam et al, Invariant Classification of Holograms of Deformable Objects Based on Deep Learning, IEEE 28th International Symposium on Industrial Electronics (ISIE), pp. 2392-2396 (Year: 2019).*

(Continued)

*Primary Examiner* — Ping Y Hsieh
*Assistant Examiner* — Xiao Liu
(74) *Attorney, Agent, or Firm* — Oliff PLC (57) ABSTRACT

A document liveness detection method comprising using a hardware processor for prompting an end-user of an electronic device, having a camera, to provide an image sequence of a physical document whose orientation is undergoing change; and image-processing the image sequence to yield an output indication of whether or not the image sequence was generated by capturing a live or physical document; and providing the output indication to at least one computerized system or human.

17 Claims, 6 Drawing Sheets

(56) References Cited

U.S. PATENT DOCUMENTS

| | | | |
|---|---|---|---|
| 2017/0236034 A1 | 8/2017 | Dolev | |
| 2018/0268240 A1* | 9/2018 | Loce | G06F 21/6254 |
| 2019/0019282 A1 | 1/2019 | Atzmon et al. | |
| 2019/0205634 A1* | 7/2019 | Mayer | H04N 23/64 |
| 2019/0251774 A1* | 8/2019 | Azanza Ladrón | G07D 7/206 |
| 2021/0117529 A1* | 4/2021 | Zamora Martínez | G06F 21/32 |
| 2021/0124919 A1* | 4/2021 | Balakrishnan | G06V 30/418 |
| 2022/0108121 A1* | 4/2022 | Das | G06V 30/18 |
| 2023/0025450 A1* | 1/2023 | De La Comble | G06N 3/082 |

FOREIGN PATENT DOCUMENTS

| | | | |
|---|---|---|---|
| DE | 102013101587 A1 | 8/2014 | |
| WO | 2008/020208 A1 | 2/2008 | |
| WO | 2016/139653 A2 | 9/2016 | |
| WO | 2020/089907 A1 | 5/2020 | |
| WO | WO-2020169959 A1 * | 8/2020 | G01C 21/34 |

OTHER PUBLICATIONS

Lam et al, Ensemble convolutional neural network for classifying holograms of deformable objects, Optics Express, vol. 27, No. 23, Nov. 11 (Year: 2019).*

Daniel Hartl et al, Efficient Verification of Holograms Using Mobile Augmented Reality, IEEE Transactions on Visualization and Computer Graphics, vol. 22, No. 7, Jul. (Year: 2016).*

"Video Tracking"; Wikipedia; Oct. 20, 2020; <https://en.wikipedia.org/w/index.php?title=Video_tracking&oldid=984430383>.

Hartl, Andreas Daniel et al., "Efficient Verification of Holograms Using Mobile Augmented Reality.", IEEE Transactions on Visualization and Computer Graphics, (2016), vol. 22, No. 7, pp. 1843-1851.

Anonymous, "Technical Guideline TR-03147: Assurance Level Assessment of Procedures for Identity Verification of Natural Persons", (2018), XP055914034, pp. 1-38.

* cited by examiner

| Key | Value Type | Notes |
|---|---|---|
| frame | image | encoded to base64 with jpg compression |
| timestamp | datetime | The frame recorded datetime.<br><br>format (UTC time): %Y-%m-%dT%H:%M:%S.%f |
| frame_id | integer | The index of the frame in the stream |

Fig. 3

| Key | Value Type | Notes |
|---|---|---|
| timestamp | datetime | the time of sending the message.<br><br>format (UTC time): %Y-%m-%dT%H:%M:%S.%f |
| frame_id | integer | Match to a `frame_id` from a request message |
| session_status | integer | 0: Failed<br>1: Active<br>2: Success |
| error_message | string | general/system error message - not specific to the current running step |
| current_step | integer | 0: Calibration<br>1: Random Gesture<br>2: Thickness |
| detection_loc | array | 4 coordinates:<br>[tl_x, tl_y, br_x, br_y]<br>or empty array |
| detection_score | float | The score of the card detection.<br>Relevant only if detection_loc is not an empty array. |
| step_params | dict | Each step has a unique structure (see below).<br>Can be an empty dict. |

Fig. 4a

| status | integer | 0: Active<br>1: Failed<br>2: Success |
|---|---|---|
| error_message | string | error message |

Fig. 4b

| status | integer | 0: Active<br>1: Failed<br>2: Success |
|---|---|---|
| error_message | string | error message |
| gesture_coords | array | 4 coordinates:<br>[tl_x, tl_y, br_x, br_y]<br><br>The box which the user should place the card in. |

Fig. 4c

| status | integer | 0: Active<br>1: Failed<br>2: Success |
|---|---|---|
| error_message | string | error message |
| thickness | float | the thickness of the card in millimeters |

SYSTEM, METHOD AND COMPUTER PROGRAM PRODUCT FOR ASCERTAINING DOCUMENT LIVENESS

FIELD OF THIS DISCLOSURE

The present invention relates generally to electronic processing and more particularly to onboarding.

BACKGROUND FOR THIS DISCLOSURE

Many digital authentication systems are known, the disclosures of which are hereby incorporated by reference, such as the following co-owned patent documents: U.S. Pat. No. 10,440,219, PCT/IL2010/000933 published inter alia as US 2017/0236034, U.S. Pat. Nos. 10,607,072; 9,406,030; PCT/IL2016/050112 published as WO 2016/139653, U.S. Pat. No. 10,467,491; United States published patent application US 2019/0019282 and published PCT application WO2020089907.

Remote verification of end-user identities and ID documents is becoming increasingly critical e.g. for KYC (know your client) protocol purposes. End-users are typically remote and unsupervised.

Holograms are multilayer 3D images. Watermarking of three-dimensional objects by digital holography is known. Computer-generated hologram coding may be used to generate content-related data for embedding into personal end-user data printed on the end-user's ID document, e.g. with watermarking techniques. Digital watermarks may be embedded into holograms. A watermark image may be created, then embedded into a holographic structure created digitally using computer generated holography. The digital representation may be recorded on an ID card or other suitable physical substrate e.g. using microlithography. A watermark signal may be embedded in a physical holographic structure e.g. as it is optically recorded, e.g. by embedding the signal in an image optically merged with the holographic structure. Or, the signal may be embedded into a precursor (physical or digital) from which the holographic structure is generated. Or, a halftone watermarked image including dots is generated including creating hologram dots corresponding to the image dots.

Lamination typically comprises a layer of plastic added to paper or card sheets. Lamination types include gloss, matt and silk. Lamination finishes include holographic lamination, Cellotouch, Cellolux, and Cellogreen, and other recyclable laminates. Various substrates and adhesives and thicknesses and numbers of layers may be used, for wet or dry laminating.

Auto-capture functionality for cameras is known. For example, a camera system might provide real-time detection of edges, fix image skewness, if any, and capture the image only when a given quality threshold has been achieved. Or, a camera system might automatically enable the flash, if poor illumination is detected, before capturing the image.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments seek to provide improved verification of remotely presented documents.

Certain embodiments seek to ascertain liveness of remotely presented ostensible documents, which may, desirably, be physical documents, in which case the system seeks to confirm liveness, or may, undesirably, be mere representations of such documents, in which case the system seeks to alert for lack of document liveness.

Certain embodiments seek to provide improved identification verification based on captured remotely presented ID documents.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operation and instead, the remote processor P itself may receive output/s of portion/s of the operation from yet another processor/s P', may be deployed off-shore relative to P, or "on a cloud", and so forth.

The present invention typically includes at least the following embodiments:

Embodiment 1. A document liveness detection method comprising using a hardware processor for:

prompting an end-user of an electronic device, typically having a camera, to provide an image sequence of a physical document whose orientation may be undergoing change; and/or image-processing the image sequence to yield an output indication of whether or not the image sequence was generated by capturing a live or physical document; and/or providing the output indication e.g. to at least one computerized system and/or human.

Embodiment 2. A method according to any of the preceding embodiments wherein the image processing comprises using a classifier trained to differentiate image sequences generated by capturing a hologram whose orientation is undergoing change from image sequences generated by capturing a non-hologram representation, whose orientation is undergoing change, of a hologram, such as a paper copy, whose orientation if undergoing change, of a hologram-bearing ID document.

Embodiment 3. A method according to any of the preceding embodiments wherein the image processing comprises using a classifier trained to differentiate image sequences generated by capturing a laminated document whose orientation is undergoing change; from image sequences generated by capturing a non-laminated copy, whose orientation is undergoing change, of a laminated document.

Embodiment 4. A method according to any of the preceding embodiments wherein the classifier comprises a neural network.

Embodiment 5. A method according to any of the preceding embodiments wherein the method comprises activating the classifier only if a laminated document is present in the image sequence.

Embodiment 6. A method according to any of the preceding embodiments wherein the image processing comprises estimating thickness of the original document and comparing the thickness as estimated to a known thickness value of the physical document.

Embodiment 7. A method according to any of the preceding embodiments wherein the method receives plural categories of physical documents and wherein the known thickness value differs between the categories.

Embodiment 8. A method according to any of the preceding embodiments wherein the image processing comprises using object detection to find one of the plural categories of physical documents in the image sequence ("category C"), and comparing the thickness as estimated to a known thickness value of documents in category C.

Embodiment 9. A method according to any of the preceding embodiments wherein the using object detection to find one of the plural categories of physical documents in the image sequence ("category C") comprises automatically identifying an image of a physical document in the image sequence, as a document in category C.

Embodiment 10. A method according to any of the preceding embodiments wherein the image processing comprises receiving metadata, provided by the end-user, indicating that the physical document in an image sequence belongs to a category C and comparing the thickness as estimated to a known thickness value of documents in category C.

Embodiment 11. A method according to any of the preceding embodiments wherein the image sequence comprises a video sequence, captured by a video camera having a field of view, of an entire session conducted with the end-user, and wherein the method also comprises tracking the physical document in at least one video sequence and providing, for at least one video sequence, an output indication of whether or not the physical document as tracked has remained within the field of view over the entire session.

Embodiment 12. A method according to any of the preceding embodiments wherein the session comprises automatic activation of the end-user's electronic device's camera.

Embodiment 13. A method according to any of the preceding embodiments wherein the method comprises recognizing a hologram, if any, in the image sequence, and activating the classifier only if a hologram is recognized.

Embodiment 14. A computer program product, comprising a non-transitory tangible computer readable medium having computer readable program code embodied therein, the computer readable program code adapted to be executed to implement any method herein e.g. any of the methods of any of the preceding embodiments 1-13.

Embodiment 15. A system comprising at least one hardware processor configured to carry out the operations of any of the methods of any of the preceding embodiments 1-13.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "ui" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Example embodiments are illustrated in the various drawings. Specifically.

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. tables herein may include all or any subset of the fields and/or records and/or cells and/or rows and/or columns described.

Any order of the operations shown may be employed rather than the order shown, however preferably, the order is such as to allow utilization of results of certain operations by other operations by performing the former before the latter, as shown in the diagram.

All methods typically comprise all or any subset of the illustrated or described operations, suitably ordered e.g. as shown or described.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (E.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with: methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

The system herein is typically operative to prevent spoofing and/or to ensure "Document Liveness" i.e. that images of ID documents arriving from remote, unsupervised end-users are actual or authentic physical ID documents, rather than a (possibly doctored) photocopy or digital copy on a screen. Any suitable method/s may be used for verifying document liveness, such as all or any subset of the following:

a. Thickness estimation and/or detection, to differentiate physical ID documents from, say, photocopies thereof on paper. Typically, an alleged ID document image is processed to estimate the thickness of the alleged ID document; the estimated thickness is then compared to an expected thickness value. The expected thickness value may be a range of values which is characteristic of physical ID documents as opposed to paper copies thereof. Or, the system may store different expected thicknesses for different ID documents. For example, the thickness for a version 3 (issued in certain years) of a French driving license may be known to a system, and may differ from the thickness of a version 2, earlier issued French driving license, and from the thickness of a Ukranian passport and/or Israeli identity card.

b. Detection of hologram liveness, for identity documents which include a hologram. Typically, the system captures plural images (e.g. a video stream) of such identity documents, when they are in motion (e.g. when they are being flipped by the end-user), and verifies that the light patterns e.g. glare between these images change, as would be expected for "live" i.e. authentic, physical identity documents which include a hologram. It is appreciated that a video stream of a photocopy (or other reproduction of a hologram-including document, which includes only an image of the hologram but does not include a physical hologram) would not cause changing light patterns between the various stills in the video stream. Therefore, changing light patterns are indicative of document liveness, for hologram-bearing documents.

c. Detection of liveness of laminated documents. Typically, the system captures plural images (e.g. a video stream) of such identity documents, when they are in motion (e.g. when they are being flipped by the end-user), and verifies that the light patterns between these images change, as would be expected for "live" i.e. authentic, laminated physical identity documents whose reflection of illumination may differ, as the orientation of the laminated document changes, relative to the illumination source. It is appreciated that a video stream of a photocopy (or other reproduction) of a laminated document, which is not itself laminated, would not cause changing light patterns between the various stills in the video stream. Therefore, changing light patterns, or changes in glare, are indicative of document liveness, for documents which are known to be laminated.

To facilitate methods c, d above, the end-user is typically prompted to make a gesture which moves the identity document, within the field of view of the camera which the verification session is employing (e.g. the end-user's mobile phone front camera, or a webcam or laptop camera). For example, the end-user may be prompted to flip the identity document so that, initially, the document's front main surface is imaged and, later, the document's back main surface (or vice versa). It is appreciated that typically, such a flip results in at least one image in which the side surface or edge of the document is visible to the camera; this side view of the document may be identified and used for thickness estimation method (a) above. This is referred to herein as being a "random gesture" since the precise nature of the gesture is typically not known. The random gesture may comprising moving the document to a certain location at a certain time. The random gesture may for example comprise flipping in a certain time and/or place.

d. A "one-session" test which, by tracking, verifies that the same object is being imaged, throughout the document verification process. This prevents a situation whereby, say, a remote user succeeds in passing verification by allowing several different objects to be imaged e.g. a first paper photocopy of an ID card's front surface and/or a second paper photocopy of that ID card's back surface, and/or an unrelated credit card which enables the remote user to pass the thickness detection aspect of image verification. According to certain embodiments, the system may reject any verification session in which the alleged ID card leaves the field of view of the camera capturing the session, and/or may generate, or present to the end-user, a warning that this leaving-field-of-view event has occurred, and/or may prompt the end-user to start a new session and ensure that such events do not occur. According to certain embodiments, the system may reject any verification session in which the alleged ID card leaves the field of view of the camera capturing the session and subsequently returns to the field of view, and/or may generate, or present to the end-user, a warning that this leave-and-return event has occurred, and/or may prompt the end-user to start a new session and ensure that such events do not occur. Any suitable rules may be defined, or may be selected from a rule repository, to determine how the system relates to leaving-field-of-view events or leave-and-return events. For example, such rules may even define that such events automatically cause the end-user to fail his identification verification. Or, such events may be ignored entirely, or, such events may trigger termination of the current verification session and, possibly, send a message to the end-user that he should try again, with or without an exhortation that the end-user ensure that the ID card should always be within the camera's field of view. For example, the end-user may be instructed to leave his ID card behind, in the camera's field of view, if he needs to take his hand out of the field of view. Typically, the field of view of the camera is displayed to the user throughout the session so that the user can easily ensure that his ID card remains within the camera's field of view throughout the session. Any suitable technology may be used to track the ostensible ID document in a video of the verification session.

Typically, the system's visual tracking functionality includes target representation and/or localization and/or filtering and data association. Target representation and localization are typically configured for identifying the moving object using a suitable algorithm such as but not limited to blob tracking. Suitable target representation and localization algorithms include but are not limited to Kernel-based tracking or mean-shift tracking, or Contour tracking with detection of object boundary (e.g. active contours or Condensation algorithm). Filtering and data association typically, according to Wikipedia, "involves incorporating prior information about the scene or object, dealing with object dynamics, and evaluation of different hypotheses. These methods allow the tracking of complex objects along with more complex object interaction like tracking objects moving behind obstructions". Any suitable filtering algorithm may be used, such as but not limited to a Kalman filter or a Particle filter.

Any of the above methods (e.g. a-d above) may be employed in the course of a session which includes automatic activation of a camera, e.g. the (front facing, typically) camera of the end-user's mobile phone, typically in video mode so as to capture the entire session, typically non-stop. Typically, the system (e.g. app) first, due to privacy considerations, seeks the end-user's permission to access or activate the camera. However, alternatively, activation of the camera may be affected manually by the user (typically following a prompt to that effect) and/or the camera may be activated in still mode rather than in video mode.

Regarding thickness estimation, certain embodiments seek to estimate thickness, by prompting an end-user to provide a side view image of the ID document, then capturing the image and processing the image to determine the ID document's thickness in pixels, then converting to millimeters, and comparing the millimeter value to the known-to-the-system thicknesses, in millimeters of various known ID document types in various countries. It is appreciated that the ID document type and country (and series) may be received as metadata by prompting the end-user e.g. to select an ID type (e.g. driving license, passport, etc.) and a country which issued the ID (e.g. France, Egypt etc.), from respective menus presented to the end-user. Or, the ID document type and country (and series) may be automatically identified, e.g. as performed by conventional Au10tix systems or as described in co-owned Au10tix patent documents.

An end-user may be specifically prompted to provide a side-view image. Or, an entire document verification session may be captured as a video sequence, e.g. by an app which automatically turns on the end-user's mobile phone (typically front-facing) camera. Thickness may be estimated using a still image selected from the frames of the video sequence. For example, the ID card may be detected, as an object, in the video sequence, and may be tracked. The end-user may be prompted to make a gesture holding the ID card, e.g. to flip the ID card. As the ID card rotates e.g. from a first position in which the ID card's front main surface is visible to the camera, to a second position in which the ID card's back main surface is visible to the camera, the system identifies the frame in which the object (detected ID card) has minimal thickness. This frame may then be used for ID card thickness estimation. complete video sessions may be sent e.g. to the document liveness server detector. These videos may be processed in near realtime to yield results returned via api to external customers who seek to test their library of existing videos.

Any suitable technology may be used to detect the ID card in a still image or video sequence thereof. For example, object detection algorithms are provided in OpenCV, a computer vision library. Other object detection algorithms include R-CNN, Fast-RCNN, Faster-RCNN, RetinaNet, SSD and YOLO. Object detection may employ deep learning and/or machine learning and/or neural networks. ImageAI is a "python library that lets programmers and software developers easily integrate state-of-the-art computer vision technologies into their existing and new applications, using just few lines of code", which may be used to facilitate object detection (such as ID card detection).

Any suitable tool or algorithm or process may be used to determine thickness of the imaged ID document e.g. when image-processing a still image selected as a side-view (having minimal thickness) of the ID document. For example, image measurement software is available which takes measurements of objects represented in image formats such as BMP, TIFF, PNG, JPEG, GIF. Image Measurement Software For Windows includes, for example, ImageJ and IC Measure.

In gesture-based liveness detection, e.g. of holograms or lamination (methods b, c above), an end-user may be prompted to make a gesture while holding the object he is alleging to be a physical ID document, and images of this event may be captured. Typically, a flash is activated while imaging this event, to ensure that reflection from the hologram (if any) is visible as the event proceeds e.g. as the hologram is saved around (as the reflection changes). If the object is indeed a physical ID document which includes a hologram, light will be reflected from the hologram, and as the end-user flips (or otherwise moves) the object (and hologram), the hologram's orientation relative to the illumination source/s changes, thus the light patterns change. In contrast, if the object is not a physical ID document which includes a hologram, then as the end-user flips the object, the light patterns either do not change, or do not change in the same way. Thus, if the system analyzes the light patterns in the captured images the system may differentiate (i) changing light patterns indicative of light reflected from a physical ID document which includes a hologram, from (ii) light patterns which are not so indicative e.g. if the object is a counterfeit ID card which does not include a hologram. For example, a neural network may be trained to differentiate events of type (i) from events of type (ii).

Gesture-based detection as above may also be used to identify objects, on which lamination may be undesirable, such as American social security cards which are not allowed to be laminated. Typically, the detector knows the location and/or size of the holograms. The system may take or retain or provide captured images of various angles/lights states as evidence of results of the liveness test.

Hologram liveness detection may include processing the image of the ID card in order to determine whether or not the ID card includes a hologram. This image processing may include automatic identification of the country and type (and series) of the ID card, e.g. as performed by conventional Au10tix systems or as described in co-owned patent documents such as U.S. Pat. No. 10,440,219 or 9,406,030 or 9,628,661, the disclosures of which are hereby incorporated by reference.

Automatic identification of the country and type (and series) of the ID card is also useful for thickness-based liveness tests, if the system stores different expected thicknesses for various ID documents of various countries, types and series, as described elsewhere herein.

Then, a data repository may be maintained which stipulates which country/type/series of ID cards bear holograms, and optionally other data such as where the hologram is located and details regarding the appearance of the hologram itself e.g. size, location colors of each layer thereof, type of hologram, etc. Alternatively, or in addition, the hologram may be recognized as an object, in at least one image of the ID card. Any suitable objection detection technology may be employed to achieve this, e.g. object detection algorithms in OpenCV, CNN algorithms such as R-CNN, Fast-RCNN, Faster-RCNN; RetinaNet, SSD, YOLO, deep learning, machine learning, neural networks, and ImageAI.

Typically, a neural network or classifier is trained, typically (although not necessarily) separately for each country (e.g. "Germany")/type (e.g. "passport")/series of ID cards which bears a hologram. The neural net or classifier is trained using a training set which includes plural (say a few dozen or a few hundred or a few thousand) still image sequences e.g. video sequences of ID cards (typically all of the same country/type/series) which bear a hologram and which are being flipped or otherwise manipulated by the end-user so as to change their spatial orientation. The training set may also include still image sequences e.g. video sequences capturing images of ID cards (typically of the same country/type/series) which bear an image of a hologram and which are being flipped or otherwise manipulated so as to change their spatial orientation. This results in a neural net or classifier able to differentiate still image sequences e.g. video sequences of actual physical hologram-bearing ID cards, from still image sequences e.g. video sequences capturing mere images of actual physical hologram-bearing ID cards, whose images merely include an image of the hologram and no actual hologram, such that light patterns do not change between images (as opposed to sequences of actual physical hologram-bearing ID cards, which are characterized in that light patterns do change between images).

According to one embodiment, the system includes a first neural network or classifier trained to distinguish live hologram-bearing ID documents, from non-live representations of hologram-bearing ID documents; and/or a second neural network or classifier trained to distinguish live laminated ID documents, from non-live representations of such documents and/or from non-laminated documents e.g. non-laminated instances of the same documents; and/or a third neural network or classifier trained to distinguish documents with expected thicknesses, from documents lacking expected thicknesses.

Alternatively, the system may include a single neural network which makes all or any subset of the above distinctions.

All of these neural networks may make these distinctions based on the same image sequence of the ostensible ID document. The image sequence used as input may be the actual image sequence e.g. video sequence captured during the session, or an image sequence derived from the raw image sequence e.g. video sequence as captured, e.g. by pre-processing and/or by selecting only a few images from the entire available sequence of images (e.g. only a few frames from the total video sequence of the session, perhaps one or more before the flip, one or more during the flip, and one or more after the flip). Or, one or more frames or images in which the ID document's orientation is roughly horizontal aka 0%, one or more frames or images in which the ID document's orientation is roughly 30%, and one or more frames or images in which the ID document's orientation is roughly 60%. Or, a time-based subsequence of frames may be selected e.g., say, one frame for each second of session video (resulting in 15 frames if the session video is 15 seconds long). The system may also compute the average size of the frames e.g. to better determine the thickness value. Alternatively or in addition, the system may also be configured for detecting the full length of the card and comparing the full length with the thickness value e.g. to ensure the proportions are right e.g. as expected. Alternatively or in addition, the system may also be configured for detecting thickness in dozens of multiple locations between the top and bottom of the card. Every pair (bottom and top) of dots may yield a thickness value. detecting the thickness along the card. Based on this data, the system may decide the probability and confidence of the detection. For example: if 20 dots are found on the card and only 5 of them detected the right thickness values, the system may show the avg. thickness value+probability of accuracy. Typically, more then 80% of the dots have the right thickness values for a high or over-threshold probability score.

A final determination of whether the end-user is or is not validated, may be made by computing a suitable logical combination of the outputs of the various neural networks e.g. only if all relevant liveness tests are passed, is the end-user validated. Thus, if the end-user presents a laminated hologram-bearing ID document, the end-user may be validated only if the first and second nets both confirm the document is live, and the third net confirms that the document's thickness is as expected. Or, fuzzy logic criteria may be employed to logically combine the outputs of the various neural networks.

Typically, the second neural network or classifier is trained, typically separately for each country, type, and series of laminated ID documents, since lamination materials and procedures may differ between countries, types and series. The neural net or classifier is trained using a training set which includes plural (say a few dozen or a few hundred or a few thousand) still image sequences e.g. video sequences of, say, laminated Israeli ID cards, being flipped or otherwise manipulated so as to change their spatial orientation. The trained neural net or classifier is able to differentiate still image sequences e.g. video sequences of laminated ID cards, from still image sequences e.g. video sequences capturing images of non-laminated objects, in which light patterns e.g. glare do not change between images (as opposed to sequences of actual laminated ID cards, which are characterized in that light patterns e.g. glare do change between images).

It is appreciated that any type of machine learning or deep learning may be used to teach the system herein to differentiate flips (or other manipulations) of laminated documents or holograms from flips of copies of laminated documents or holograms, whose copies are not, themselves, laminated or holograms, or are laminated differently than the original. The neural network-based embodiments herein are merely exemplary; any suitable technology may be employed to develop, even by trial and error, at least one descriptor which quantifies differences between illumination patterns present in each of a sequence of images representative of the flip (e.g. first, second and . . . nth's images of the alleged laminated document or hologram, representing n different points of time within the flip). Then, the system may determine, even by trial and error, a threshold for the descriptor which differentiates sequences showing laminated documents or holograms being flipped (high degree of illumination differences) from flips of copies of laminated documents or holograms, whose copies are not, themselves, laminated or holograms (have a low degree of illumination differences).

Figure 1:
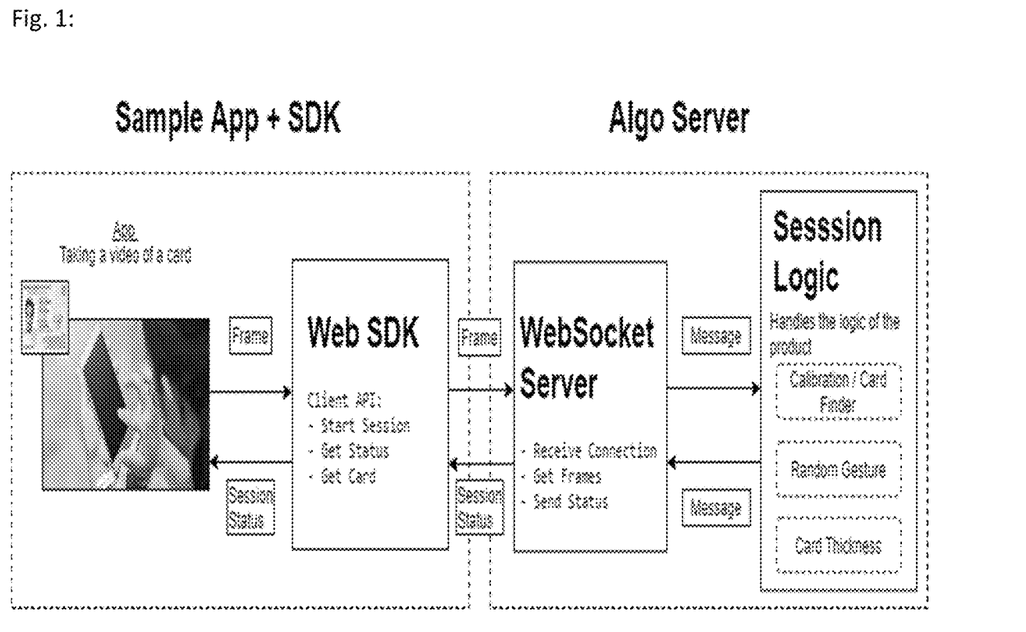
FIG. 1 is a top-level diagram of an example system.
Figure 2:
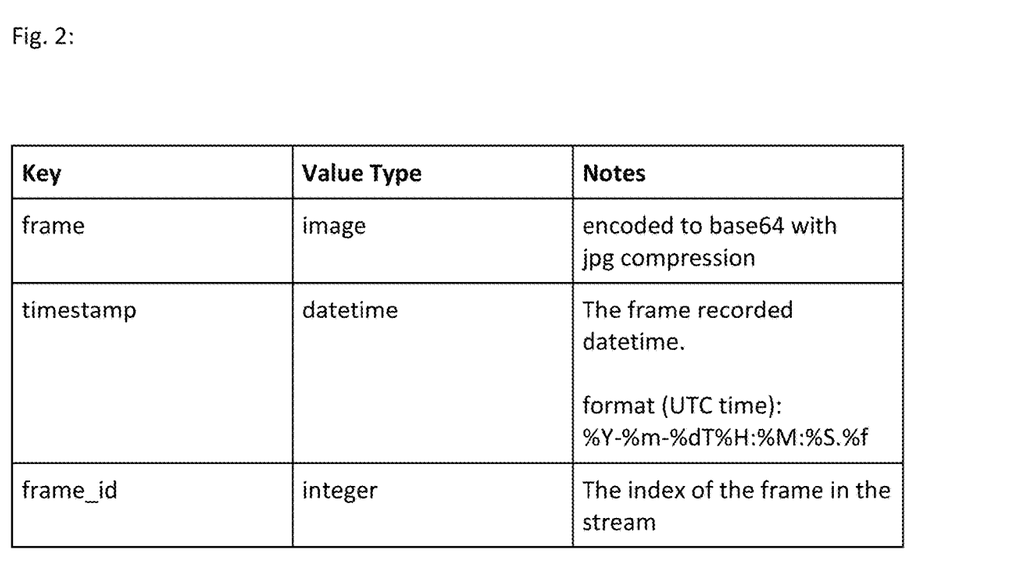
FIG. 2 is a table describing SDK-to-server communication (SDK->Server)
Figure 3:
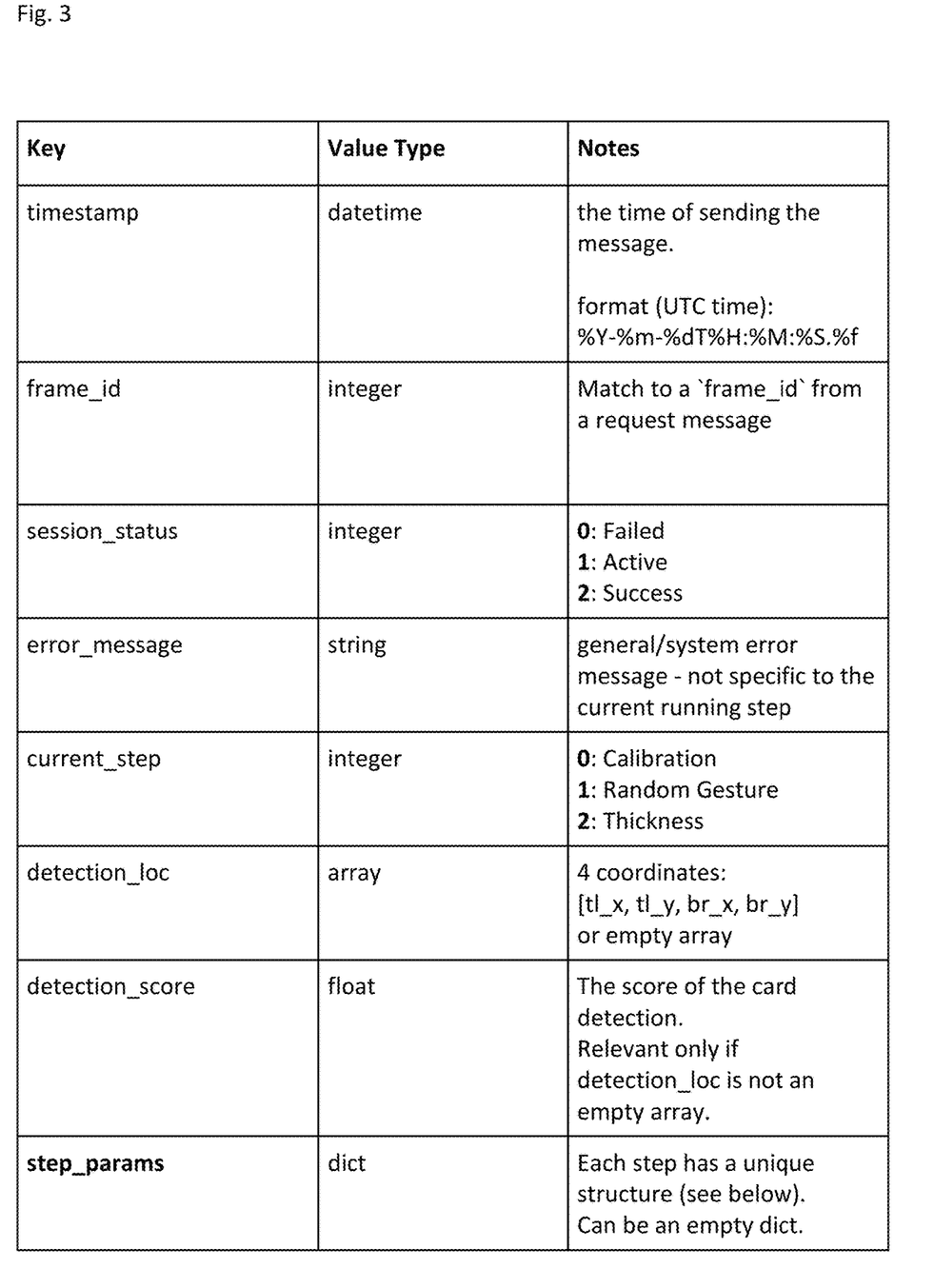
FIGS. 3, 4a-4c are tables useful in understanding certain embodiments.
Figure 4A:
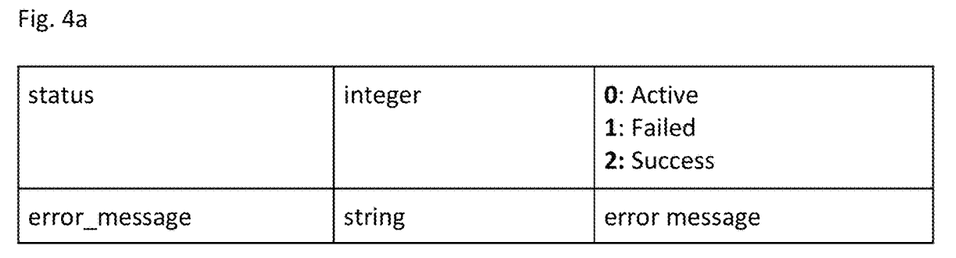
Figure 4B:
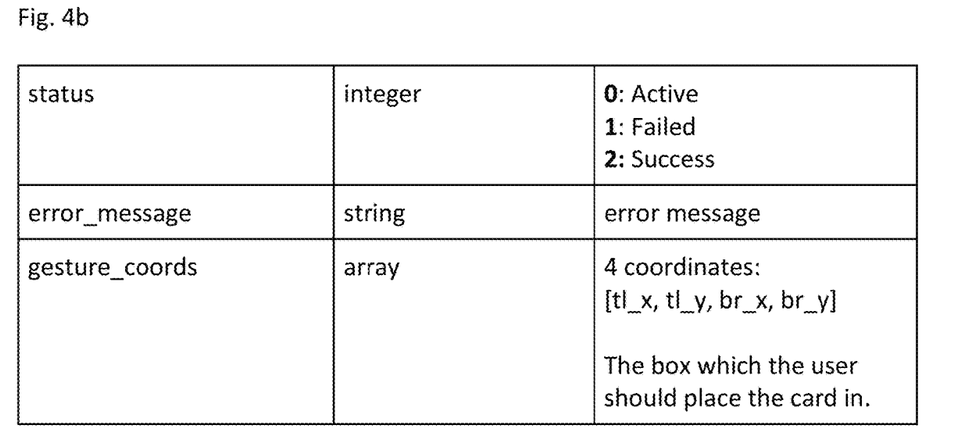
Figure 4C:
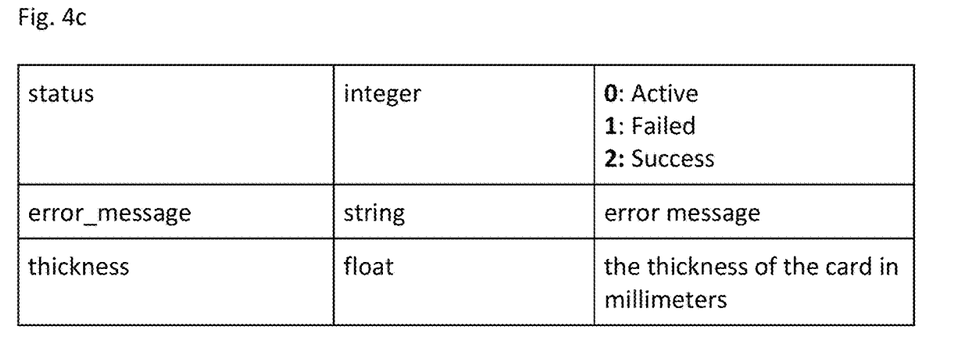

Typically, an SDK is used to create document liveness application/s, which have all or any subset of the functionality described herein, and which communicate to other applications such as, say, a financial institution's cell app, typically via one or more suitable APIs. One possible SDK and ALGO-server communication protocol is now described in detail, merely by way of example. FIG. 1 is a top-level diagram of an example system; all or any subset of the following components may be provided, suitably interconnected e.g. as shown:

ALGO server: Runs card validation analytics.
Web SDK: Handles clients and/or exposes API based on the server capabilities.
App: Front-end. Sample app which communicates with the end user.
Server-SDK Communication is typically 2-way communication, e.g. over Websocket Secure.

On each new session the SDK typically creates a new connection to the ALGO server and typically, from that point on, all the session communication is passed on this unique socket. Messages may be encoded in JSON format.

Reference is now made to FIGS. 2, 3, 4a-4c which are tables useful in understanding certain embodiments. It is appreciated that all or any subset of the particular rows columns and cells may be as illustrated. The table of FIG. 2 describes SDK-to-server communication (SDK->Server).

Server->SDK communication is described by the tables of FIG. 3, 4a-4c. These respectively describe an example base message, an example calibration step, an example random gesture step and an example thickness (detection) step.

Figure 5:
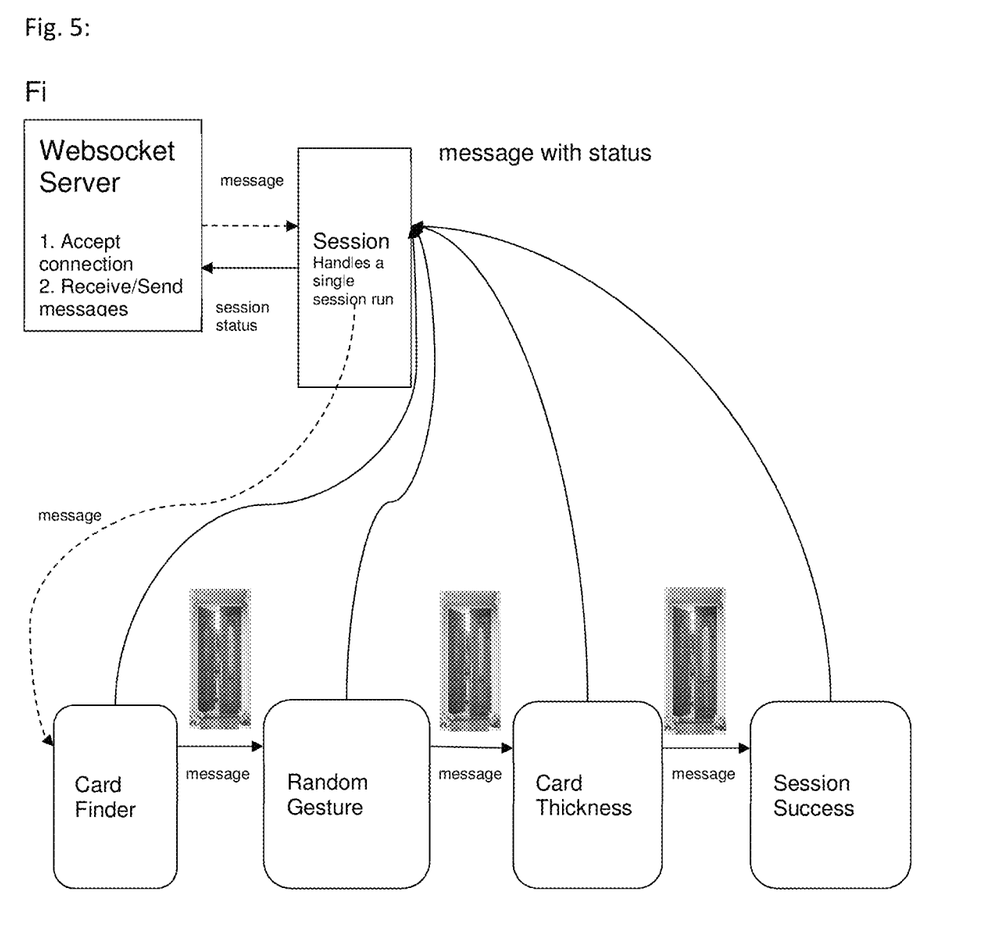
FIG. 5 illustrates example principles of operation of a document liveness detection system such as the system of FIG. 1.

Reference is now made to FIG. 5 which illustrates example principles of operation of a document liveness detection system such as the system of FIG. 1.

The server (e.g. of FIG. 1) may be designed to have a pipe-like structure:

All or any subset of the chapters may be up all the time. The communication between them may be based on push/pull.

The Websocket server (e.g. of FIG. 1) may be configured for waiting for new connections/sessions.

When a new connection is accepted, a session object may be created and the incoming messages then typically begin to flow in the pipe.

The chapters may be activated one after the other. Certain (e.g. all) chapters may not forward messages (the door is closed) until that chapter completed its task successfully.

When the task is completed, the chapter may or may not be kept running as a provider to subsequent chapters. For example, the card finder of FIG. 1 may be configured to track the card or ID document of the end-user and subsequent chapters (e.g. "card thickness") may uses the ID document's location. A session success chapter may be defined at the end of the pipe. When this chapter is reached, this typically indicates that all previous chapters in the pipe ended successfully, and thus the session status may be set to success.

The Websocket server of FIG. 1 may be configured to handle communication from/to the SDK. A new session object is created on each connection and it gets a handle to communicate with the SDK. According to certain embodiments, the connections are limited to one at a time, thus only one session is alive at once.

Other components of the system may include all or any subset of the following:

Session:
Handles a single session run. Forwards and validates messages from the SDK and builds responses to the SDK. When the end of the session is reached (failure or success), the session typically notifies all the chapters (system message) to clean their state.

Chapters: wrappers may be created (e.g. using an inheritance principle) to yield a convenient, fast implementation of chapters logic. A new chapter implementer is typically only exposed to a very simple and straightforward API (see below re AlgoChapter).

BaseChapter: The base class which wraps the communication to/from the chapter to the other components. All or any subset of the following 4 main channels may be provided:
Input from the previous chapter
Input directly from the session (e.g. system messages)
Output to the next chapter
Output to the session object (and afterwards to the client)
Typically runs other communication related capabilities such as messages dropout—to make sure the system running close to real-time. Based on the state/message-content, the baseChapter may decide whether the message is to be forwarded to the next chapter (the "door" is open) or is to be returned to the client.

MultirunChapter (typically inherits from BaseChapter): Adds multi-try awareness to the chapter. Allows the AlgoChapter implementer to focus only on the main business logic. May contain all or any subset of the following (typically, everything is configurable):
Max retries; Max timeout per try; Cooldown time between tries (e.g. to allow the user to set back the card to the base position).

"AlgoChapter" (typically inherits from MultirunChapter) Implements the main chapter logic. This may include various functionalities which facilitate document liveness detection, such as all or any subset of:
CardFinderChapter—detects and tracks the card
RandomGestureChapter—validates the user's liveliness
ThicknessChapter—validates the card thickness
algoChapter typically implements one or both of the following 2 "main" functions:
1. process(message)->message which may include all or any subset of the following, suitably ordered e.g. as shown:
Get the message from the previous chapter (or directly from the session if it is the first chapter) and run the chapter logic.
Update the chapter status to active (which is the default), success or failure.
Add fields to the message that it needs to return to the user and wants to forward to the next chapter (if there are any).
2. clean( ): cleans the internal state between tries/sessions.

Advantages of the embodiments of FIGS. 1-5 include all or any subset of the following:
parallel processing of messages is facilitated—e.g. running card detection while computing thickness, which enhances latency—to best utilize resources with minimal frame dropping which might adversely affect the algorithms performance. The parallel processing also allows Card finder logic to be running all the time even if next chapters are slower or at cooldown between tries. Since it is desired to track the card all the time (e.g. to prevent a paper photocopy from being replaced, by the end-user, with a plastic card), it is helpful to thus minimize slowdown due to other components.

Another advantage of the embodiments of FIGS. 1-5 is facilitation of a convenient implementation of any new chapters. The base classes implement all the peripheral and common capabilities which exposes a very simple and clean API, and nonetheless, the ALGO chapter has extensive freedom to decide how to handle messages and responses which yields convenient flexibility when the time comes to introduce new future chapters in the future.

Also, each chapter can easily pass information to subsequent chapter/s (e.g. by simply adding that information to the message).

Also, messages typically flow between the chapter directly, yielding a system which is (a) less prone to bottlenecks since there is no single component ("manager") through which all messages must pass; and (b) easier to debut since message flow is predictable and easily traceable.

According to certain embodiments, all UIs are configurable by the hosting app, and are not part of the SDK. SDK may supply the JSON results responsible for the app experience.

The order of activation of the session phases may be modular. Also, system customers that choose not to activate a phase (e.g. the one session or the capturing) are typically able to cancel those phases e.g. to ensure that a session will not fail unnecessarily.

The SDK may have various configurable aspects such as all or any subset of Time frames, Phases, Thresholds.

Figure 6A:
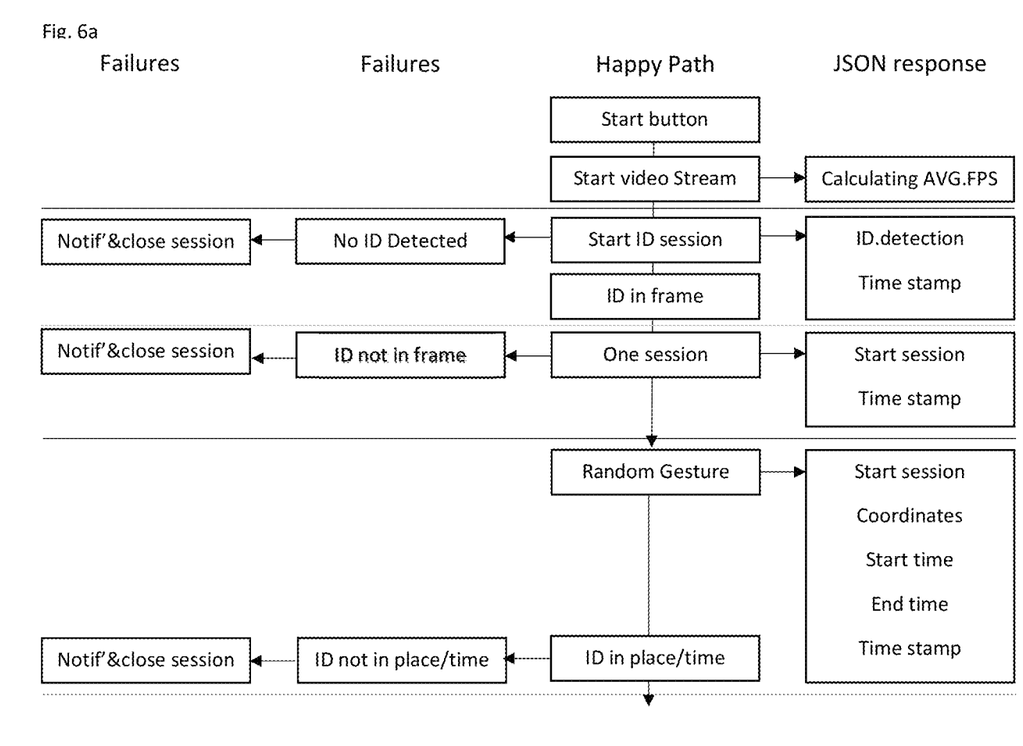
FIGS. 6a-6b, taken together, are an example flow diagram of a document liveness detection system.
Figure 6B:
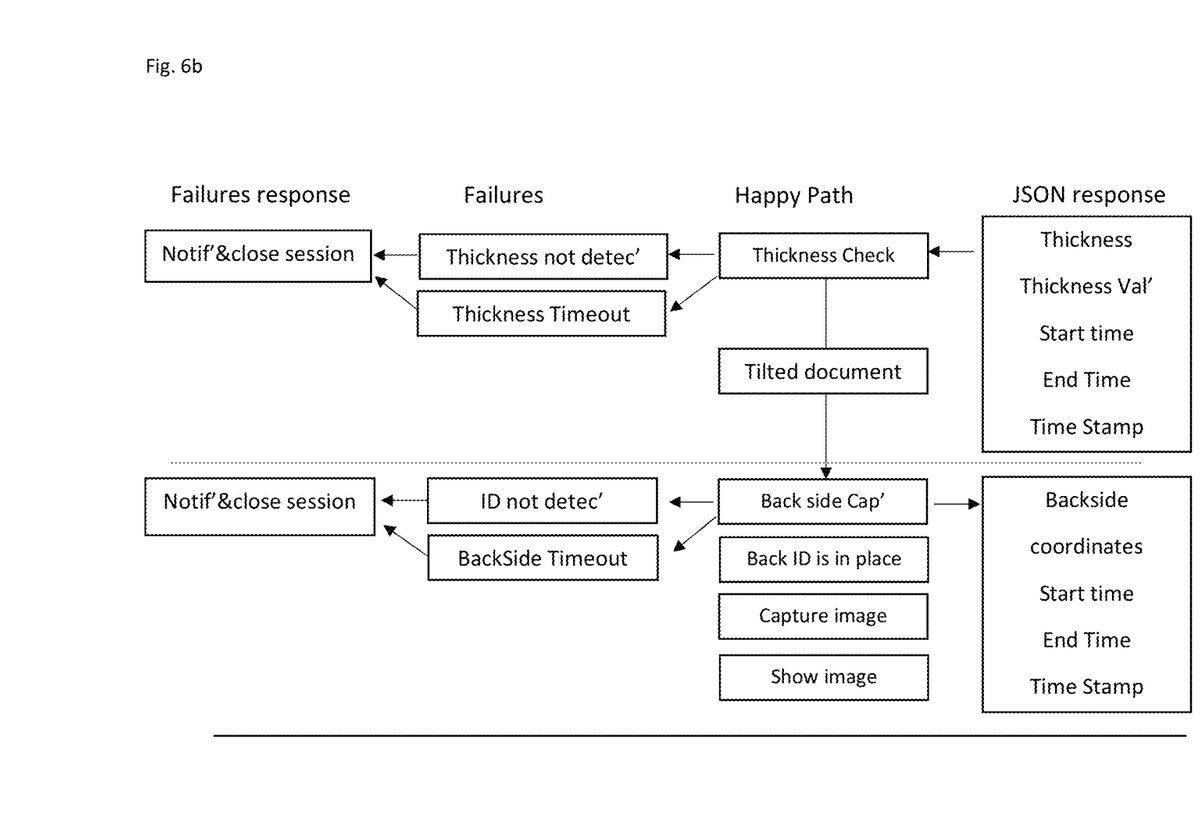

FIGS. 6a-6b, taken together, are an example flow diagram of a document liveness detection system; all or any subset of the illustrated blocks may be provided, in any suitable arrangement e.g. as shown. In the flow as shown, the liveness testing includes one-session, random-gesture and thickness-check, however this is not intended to be limiting, nor is the order of operations intended to be limiting. For example, prompting the user to flip the document, thereby to yield a document (termed a tilted document) whose back side faces the camera, thereby to facilitate "back side capture", need not be after the front-side check and can instead be before. Also, if the thickness or ID are not detected, this may result, but not necessarily, in notification to end-user and/or front end and/or back end, and closing of the session. Also, the specific JSON responses indicated are merely exemplary. For example, the "thickness values" JSON response need not also include start and end-times or time stamp.

Real Time Response—Using Video Stream

The document liveness SDK may respond in real time to the end user, which is greatly advantageous. Typically, video stream is sent to the back end where an NN (say) may have been trained for processing the video frames received by the backend, and providing Realtime feedback. Near Realtime response is typically less than 0.5 sec per frame. The response may be shown e.g. as a result of the JSON in the app. This result may be sent as a log of the session (analytics). The average performance (e.g. in frames per second or fps) may be updated in real time.

The app (aka "Sample app") typically shows a JSON result which may be sent as a log.

Start ID Session

To initialize this process an ID may be detected first. If ID was not detected in "X" (typically configurable) time frame e.g. 10 seconds, the SDK may return "No ID detected". A notification may be shown at the beginning of this stage asking to show ID. And accordingly, to the status update the notification. ID detection may show the certainty or level of confidence and may allow changing the threshold.

The app typically shows all or any subset of the following:
JSON result
Start session: Started/No ID detected/Detected
ID.detection: 0.82
Coordinates: y1, y2, x1, x2 (for cropping)
Time limit: 10:00
Time stamp: 04:98
The SDK may crop the image based on the coordinates; the app may show the cropped image that was taken or captured.
If No ID is detected within the configured timeframe, the app may show an error message such as "No ID Detected" and after 2 seconds (say), close the session.

One Session

An end-User is typically expected not to replace her or his ID in mid-session. If the user does replace her or his ID mid-session, a notification is typically sent to the client side—allowing the SDK user to create a customized decision based on the response.
app may show a JSON result including:
One session: Not started/Started/Ok/Not Ok; and/or
Time stamp: 04:98 (if session fails)
The sample may restart the session and give a suitable notice to the end user e.g. "your ID shouldn't leave the bounding box during the session—please try again".

Random Gesture

The following functionality may be provided, alternatively to or in addition to functionality described elsewhere herein at the beginning of the session. The user may be requested to place his ID in a certain expected place (random coordinators) within a certain expected time (random 1-5 sec) in a certain expected size (typically with limit). If the user's ID is not in the right/expected place or time or size, a response may be sent to the client side, and, accordingly, the app may respond. If the image of the ID is less than (say) 80% the size of the bounding box, this may be deemed negative by the system.

The app may show a suitable JSON result e.g. all or any subset of:
Random Gesture: Not started/Started/Ok/Not Ok
Random Coordinates: y1,y2,x1,x2
Start session: 02:00
End session: 05:00
Timestamp: 04:49
Based on the coordinates in the sample, a bounding box may appear with a message "Place your ID within the bounding box".
If the ID is not in place/time/size, a notification may appear e.g. "Random Gesture Failure", and the Session may then stop.

Thickness Check

The user may be expected to rotate or pivot his ID by at least 90 degrees e.g. from front view, relative to the camera, to side-view. This session may have a configurable max time frame e.g. 10 sec. The thickness value may be shown in the JSON.

The app may show the following JSON result e.g. all or any subset of:
Thickness: Not started/Started/Not Ok/Ok
Thickness.value: 0.76 (Millimeters)
StartSession: 02:00
End session: 12:00
Timestamp: 04:98
The app may show a message "Thickness detected" once thickness is complete. If thickness was not detected (bad thickness), or there was a timeout, session may end with a suitable message such as, say, "Thickness not detected" or "Timeout Thickness".

Back Document Capturing

According to certain embodiments, the user is prompted to flip the ID during the session. The system may ensure that the image is of the back side and not the front side, of the ID document. The system may wait "X" time e.g. 5 seconds before searching for the document again. If the ID is not detected within "X" timeframe the JSON may show "Not Ok" and, accordingly, the app may notify "ID not detected" and then close the session.

The app may show a suitable JSON result e.g. all or any subset of:
Back Side: Not started/Ok/Not Ok
Coordinates: y1, y2, x1, x2
Qualities: . . .
Start session: 02:00
End session: 05:00
Timestamp: 04:89
The captured image
For licensing of the system, a customer (associated with the front end of the system) may request, from an operator (entity associated with the back end) of the system herein, a JWT (JSON Web Token) which the customer then passes to the web SDK with configuration of which features that token or customer may use.

API JSON Results

The JSON result allows the application to take actions based on the results being injected in Realtime from the back to the front end. Average FPS may be 24.
All or any subset of the following may be provided:
Start session: Started/No ID detected/Detected
ID.detection: 0.82
Coordinates: y1, y2, x1, x2 (for cropping)
Time limit: 10:00
Time stamp: 04:98
One session: Not started/Started/Ok/Not Ok
Time stamp: 04:98 (—if session fails)
Random Gesture: Not started/Started/Ok/Not Ok
Random Coordinates: y1,y2,x1,x2
Start session: 02:00
End session: 05:00
Timestamp: 04:49
FrontSide: Not started/Ok
Coordinates: y1, y2, x1, x2
Time stamp: 04:98
Thickness: Not started/Started/Not Ok/Ok
Thickness.value: 0.76 (Millimeters)
StartSession: 02:00
End session: 12:00
Timestamp: 04:98
BackSide: Not started/Ok/Not Ok
Coordinates: y1, y2, x1, x2
Qualities: . . .

Start session: 02:00
End session: 05:00
Timestamp: 04:89
Testing Mechanism—Send Videos to a Specific Scenario
  Developers are typically provided with the ability to test the performance of the flow by using prerecorded video datasets. To allow control over the random scenario, the developer may be allowed to define coordinates/size/time for the random gesture before sending the video. The result may include the final JSON and captured images. The app may show the results and captured images.
Configuration
  The web SDK features may assume that there is a configuration file (which may include timeouts/thresholds) per organization that will be used throughout all this organization's sessions.
Recorded Sessions
  Typically, customers may receive documentation of successful sessions e.g. will be able to retrieve/download a video (mp4) file back with the final JSON results. This may occur at the end of the session (e.g. no need to store the video anywhere). Front or back end may create this video. This video may be sent or saved in the front end once that session is over. Videos may be uploaded separately or as a bulk upload and may then be detected by the back end and the results sent e.g. to a selected callback url.
Logs.IO
  Each session may have a unique ID which may be based on a token received from the backend. Analytics Logs may be sent based on the session JSON (session events). Additional error handling logs may be defined.
  Flips of ID documents herein may refer to horizontal flip, where the document rotates about a vertical axis, and/or to vertical flips, where the document rotates about a horizontal axis.

It is appreciated that the embodiments herein are useful for verification of identity documents, but also for analysis of documents and objects other than identity documents, even for purposes other than document liveness verification. For example, the image processing of laminated documents described herein may be used to detect ID documents which have been laminated by an end-user. For example, one use-case may be to detect laminated social security cards since lamination of such cards is forbidden.

The Document Liveness testing herein is particularly useful on mobile or desktop devices (e.g. 3G/4G/5G), using a suitable UX, but other use-cases are possible as well.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may for example comprise changing the state or condition or may more generally cause any outcome which is technically advantageous given the state or condition or data, and/or may prevent at least one outcome which is disadvantageous given the state or condition or data. Alternatively or in addition, an alert may be provided to an appropriate human operator or to an appropriate external system.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example and instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. Laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

The invention claimed is:

1. A document liveness detection method comprising using a hardware processor for:
   prompting an end-user of an electronic device, having a camera, to provide an image sequence of a physical document whose orientation is undergoing change; and
   image-processing the image sequence including generating an output indication of whether or not the image sequence was generated by capturing a live or physical document; and
   providing the output indication to at least one computerized system or human,
   wherein said image processing comprises estimating a thickness of the physical document and comparing the thickness as estimated to a known thickness value of the physical document,
   wherein plural categories of physical documents are received,
   wherein the known thickness value differs between said categories, and
   wherein said image processing comprises receiving metadata, provided by the end-user, indicating that the physical document in the image sequence belongs to a category C and comparing the thickness as estimated to a known thickness value of documents in category C.

2. A method according to claim 1 wherein the image processing comprises using a classifier trained to differentiate image sequences generated by capturing a hologram whose orientation is undergoing change from image sequences generated by capturing a non-hologram representation, whose orientation is undergoing change, of a hologram.

3. A method according to claim 2 wherein the method comprises activating said classifier only if a laminated document is present in said image sequence.

4. A method according to claim 2 wherein the method comprises recognizing a hologram, if any, in said image sequence, and activating said classifier only if a hologram is recognized.

5. A method according to claim 2, wherein the classifier is trained to differentiate image sequences generated by capturing a hologram whose orientation is undergoing change from image sequences generated by capturing a paper copy, whose orientation is undergoing change, of a hologram-bearing ID document.

6. A method according to claim 1 wherein the image processing comprises using a classifier trained to differentiate image sequences generated by capturing a laminated document whose orientation is undergoing change; from image sequences generated by capturing a non-laminated copy, whose orientation is undergoing change, of a laminated document.

7. A method according to claim 6 wherein the classifier comprises a neural network.

8. A method according to claim 1 wherein said image processing comprises using object detection to find one of the plural categories of physical documents in the image sequence ("category C"), and comparing the thickness as estimated to a known thickness value of documents in category C.

9. A method according to claim 8 wherein said using object detection to find one of the plural categories of physical documents in the image sequence ("category C") comprises automatically identifying an image of a physical document in the image sequence, as a document in category C.

10. A method according to claim 1 wherein the image sequence comprises a video sequence, captured by a video camera.

11. A method according to claim 10 further comprising automatic activation of the end-user's electronic device's camera.

12. A method according to claim 10, wherein the video sequence, captured by the video camera, represents an entire session conducted with the end-user.

13. A method according to claim 12, further comprising tracking the physical document in at least one video sequence and providing, for at least one video sequence, an output indication of whether or not the physical document as tracked has remained within a field of view over the entire session.

14. A computer program product, comprising a non-transitory tangible computer readable medium having computer readable program code embodied therein, said computer readable program code adapted to be executed to implement a document liveness detection method comprising using a hardware processor for:

prompting an end-user of an electronic device, having a camera, to provide an image sequence of a physical document whose orientation is undergoing change; and image-processing the image sequence including generating an output indication of whether or not the image sequence was generated by capturing a live or physical document; and providing the output indication to at least one computerized system or human, wherein said image processing comprises estimating a thickness of the physical document and comparing the thickness as estimated to a known thickness value of the physical document, wherein plural categories of physical documents are received, wherein the known thickness value differs between said categories, wherein said image processing comprises receiving metadata, provided by the end-user, indicating that the physical document in the image sequence belongs to a category C and comparing the thickness as estimated to a known thickness value of documents in category C.

15. A system comprising at least one hardware processor configured to carry out operations comprising:

prompting an end-user of an electronic device, having a camera, to provide an image sequence of a physical document whose orientation is undergoing change; and image-processing the image sequence including generating an output indication of whether or not the image sequence was generated by capturing a live or physical document; and providing the output indication to at least one computerized system or human, wherein said image processing comprises estimating a thickness of the physical document and comparing the thickness as estimated to a known thickness value of the physical document, wherein plural categories of physical documents are received, wherein the known thickness value differs between said categories, and wherein said image processing comprises receiving metadata, provided by the end-user, indicating that the physical document in the image sequence belongs to a category C and comparing the thickness as estimated to a known thickness value of documents in category C.

16. A system according to claim 15, wherein the end-user is prompted to manipulate an ID card to ensure the ID card rotates between first and second positions in which the ID card's respective main surfaces are visible to the camera.

17. A system according to claim 16, wherein the system identifies a frame in which the ID card has minimal thickness.

* * * * *